United States Patent [19]
Golightly et al.

[11] Patent Number: 5,908,647
[45] Date of Patent: Jun. 1, 1999

[54] MINERAL POWDERS WITH ENHANCED CHROMIUM SOLUBILITY AND PREPARATION METHODS THEREFOR

[75] Inventors: Danold Wayne Golightly, Upper Arlington; Donald Lee Sgontz, Jr., Blacklick; Bogdan Kazimierz Kedzierski, Upper Arlington; Frank Stanley Abel, Lancaster; Benita Co Yao, Columbus, all of Ohio

[73] Assignee: Abbott Laboratories, Abbott Park, Ill.

[21] Appl. No.: 08/827,770

[22] Filed: Apr. 11, 1997

Related U.S. Application Data

[63] Continuation of application No. 08/478,639, Jun. 7, 1995, abandoned.

[51] Int. Cl.⁶ .................................................. A23L 1/304
[52] U.S. Cl. .............................. 426/74; 426/97; 426/292; 426/297; 426/443
[58] Field of Search ............................... 426/74, 97, 292, 426/297, 443

[56] References Cited

U.S. PATENT DOCUMENTS

| | | |
|---|---|---|
| 3,925,433 | 12/1975 | Abdel-Monem et al. ....... 260/438.5 R |
| 4,214,996 | 7/1980 | Buddemeyer .............................. 426/74 |
| 4,335,116 | 6/1982 | Howard ................................... 424/201 |
| 4,915,962 | 4/1990 | Howard ..................................... 426/74 |
| 5,221,545 | 6/1993 | Borschel et al. .......................... 426/74 |
| 5,294,606 | 3/1994 | Hastings ................................... 514/53 |
| 5,340,834 | 8/1994 | Stitt ........................................ 514/505 |

FOREIGN PATENT DOCUMENTS

| | | |
|---|---|---|
| 0 247 616 A2 | 5/1987 | European Pat. Off. . |
| 89/10357 | 11/1989 | WIPO . |
| 94/02036 | 2/1994 | WIPO . |

OTHER PUBLICATIONS

Kauaouci, et al., In Vitro Effect Of Chelating Agents On Chromium Solubility And Dialyzability, Microbiologic—Aliments—Nutrition, 1991, vol. 9, 77–81.

*Recommended Dietary Allowances*, Food and Nutrition Board, Commission on Life Sciences, National Research Council, 10th Edition, National Academy Press, Washington, D.C., 1989.

*Food Chemical Codex*, Third Edition, National Academy Press, Washington, 1981.

*Everything Added to Food in the United States*, U.S. Food and Drug Administration, CRC Press, Inc., Boca Raton, FL., 1993.

*Advanced Inorganic Chemistry, A Comprehensive Text*, F. Albert Cotton and Geoffrey Wilkinson, Third Edition, Interscience Publishers, New York, 1972.

*Inorganic Reactions and Structure*, Edwin S. Gould, Henry Holt and Company, New York, 1955.

*Nutritional Biochemistry and Metabolism with Clinical Applications*, Maria C. Linder, Second Edition, Nutrition and Metabolism of the Trace Elements, Chapter 7 in Maria C. Linder, Ed., Elsevier, New York, 1991.

*Food and Dietary Factors Influencing Levels and Bioavailability of Trace Elements*, Bo Lönnerdal, *Nutrient Availability: Chemical and Biological Aspects* in D.A.T. Southgate, I.T. Johnson and G.R. Fenwick, Special Publication No. 72, Royal Society of Chemistry, Cambridge, 1989.

*Primary Examiner*—Helen Pratt
*Attorney, Agent, or Firm*—D. O. Nickey; Thomas D. Brainard

[57] ABSTRACT

Process methods are described for combining compounds of mineral nutrients into chemically stable powder mixtures that notably preserve chromium in a soluble form conducive to both absorption and bioavailability. The methods include the compounds of minerals in preferred chemical forms, procedures for treatment of certain compounds to maintain solubility, appropriate sequences for combination of the compounds and other premix ingredients, and blending to provide an adequately homogeneous mixture. The methods provide premixes of minerals that support bioavailable chromium and that exhibit good stability, solubility, odor and color for addition to nutritional products.

39 Claims, 5 Drawing Sheets

| ///// | BLEND A |
|---|---|
| kg | INGREDIENTS |
| 204.600 | $Zn_2SO_4 \cdot 1-2\ H_2O$ |
| 1.434 | $CrCl_3 \cdot 6H_2O$ |
| 0.610 | $Na_2SeO_4$ |
| 1.475 | $Na_2MoO_4 \cdot 2H_2O$ |
| 449.841 | MALTODEXTRIN |
| 657.960 | |

| ///// | BLEND B |
|---|---|
| kg | INGREDIENTS |
| 197.00 | $FeSO_4 \cdot 1-2\ H_2O$ |
| 29.20 | $CuSO_4$ |
| 54.12 | $MnSO_4 \cdot H_2O$ |
| 61.72 | CITRIC ACID |
| 342.04 | |

MILL THROUGH FITZMILL NO. 4 BAND. BLEND 15 MIN DISCHARGE THROUGH FITZMILL NO. 0 BAND.

BLEND 15 MIN. DISCHARGE THROUGH FITZMILL NO. 0 BAND.

| ///// | FINAL BLEND |
|---|---|
| kg | INGREDIENTS |
| 657.96 | BLEND A |
| 342.04 | BLEND B |
| 1000.00 | |

SIFT THROUGH 16-MESH SCREEN INTO BLENDER. BLEND FOR 1 HOUR

① SIFT THROUGH 16-MESH SCREEN INTO DRUM. CHECK FOR LUMPS.
② IF LUMPS ARE FOUND, SIFT THROUGH 16-MESH SCREEN BACK INTO BLENDER. BLEND FOR 15 MINUTES.
③ DISCHARGE BLENDER CONTENTS INTO FIBER DRUMS.

FIG.1
PRIOR ART

| g | SPRAY DRIED Cr |
|---|---|
|  | INGREDIENTS SPRAY DRIED MIX |
| 46 | $CrCl_3 \cdot 6H_2O$ |
| 46 | CITRIC ACID |
| 162 | MALTODEXTRIN IN SPRAY DRIED MIX |
| 254 |  |

| g | BLEND #1 |
|---|---|
|  | INGREDIENTS |
| 254 | SPRAY DRIED Cr |
| 391 | MALTODEXTRIN |
| 645 |  |

FIG.4

| g | FINAL BLEND |
|---|---|
|  | INGREDIENTS |
| 642 | BLEND #1 |
| 4809 | BLEND #4 |
| 5751 | $ZnSO_4 \cdot 1-2\ H_2O$ |
| 4900 | $FeSO_4 \cdot 1-2\ H_2O$ |
| 1470 | CITRIC ACID |
| 7355 | MALTODEXTRIN |
| 24,927 |  |

MILL THROUGH FITZMILL D6 0.065" SCREEN.

| g | BLEND #2 |
|---|---|
|  | INGREDIENTS |
| 38 | $Na_2MoO_4 \cdot 2H_2O$ |
| 592 | MALTODEXTRIN |
| 17 | $Na_2SeO_4$ |
| 647 |  |

MILL THROUGH FITZMILL D6 0.039" SCREEN.

| g | BLEND #3 |
|---|---|
|  | INGREDIENTS |
| 748 | $CuSO_4 \cdot 5H_2O$ |
| 1389 | $MnSO_4 \cdot H_2O$ |
| 2092 | MALTODEXTRIN |
| 4229 |  |

| g | BLEND #4 |
|---|---|
|  | INGREDIENTS |
| 645 | BLEND #2 |
| 4187 | BLEND #3 |
| 4832 |  |

FIG. 5

| g | MICROENCAPSULATED Cr |
|---|---|
| | INGREDIENTS |
| | MICROENCAPSULATED SPRAY-DRIED Cr MALTODEXTRIN |
| 46 | $CrCl_3 \cdot 6H_2O$ |
| 46 | CITRIC ACID |
| 199 | MALTODEXTRIN (IN SOLUTIONS FOR SPRAY DRY & ENCAPSULATION) |
| 291 | |

| g | BLEND #1 |
|---|---|
| | INGREDIENTS |
| 230 | MICROENCAPSULATED Cr |
| 370 | MALTODEXTRIN |
| 600 | |

| g | BLEND #2 |
|---|---|
| | INGREDIENTS |
| 38 | $Na_2MoO_4 \cdot 2H_2O$ |
| 181 | MALTODEXTRIN |
| 225 | |

| g | BLEND #3 |
|---|---|
| | INGREDIENTS |
| 222 | BLEND #2 |
| 17 | $Na_2SeO_4$ |
| 408 | MALTODEXTRIN |
| 647 | |

| g | BLEND #4 |
|---|---|
| | INGREDIENTS |
| 748 | $CuSO_4 \cdot 5H_2O$ |
| 1389 | $MnSO_4 \cdot H_2O$ |
| 2092 | MALTODEXTRIN |
| 4229 | |

| g | BLEND #5 |
|---|---|
| | INGREDIENTS |
| 645 | BLEND #3 |
| 4187 | BLEND #4 |
| 4832 | |

MILL THROUGH FITZMILL D6 0.039" SCREEN.

| g | FINAL BLEND |
|---|---|
| | INGREDIENTS |
| 597 | BLEND #1 |
| 4809 | BLEND #5 |
| 5751 | $ZnSO_4 \cdot 1-2 \ H_2O$ |
| 4900 | $FeSO_4 \cdot 1-2 \ H_2O$ |
| 1515 | CITRIC ACID |
| 7355 | MALTODEXTRIN |
| 24927 | |

DO NOT MILL FINAL BLEND.

MINERAL POWDERS WITH ENHANCED CHROMIUM SOLUBILITY AND PREPARATION METHODS THEREFOR

This application is a continuation of application Ser. No. 08/478,639 filed Jun. 7, 1995, now abandoned.

FIELD OF THE INVENTION

The invention relates to methods that provide soluble mineral nutrients, with emphasis on providing and sustaining soluble chromium in a stable powder premix for use in nutritional products.

BACKGROUND OF THE INVENTION

Trace and ultratrace nutrient minerals are added to nutritional foods to attain caloric-based concentrations that provide mineral intakes at levels recommended by the Food and Nutrition Board of the National Research Council (*Recommended Dietary Allowances*, RDA, incorporated herein by reference) or other recognized official sources. Trace minerals in foods occur at concentrations in the microgram-per-gram range and commonly include iron, copper, zinc and manganese. Ultratrace minerals in foods are in the nanogram-per-gram concentration range; chromium, molybdenum and selenium constitute the ultratrace minerals cited in the current *Recommended Dietary Allowances*. Typically, water-soluble mineral salts that meet standards of composition and purity, such as those described in the *Food Chemicals Codex*, are added to supplement levels of nutrients endogenous to a typical food matrix of proteins, carbohydrates, lipids and water. These mineral salts must provide the nutrient elements in preferred oxidation states to enable absorption and bio-utilization. For example, iron needs to be present in premixes as ferrous ion, Fe(II), and chromium must be present as chromic ion, Cr(III). Inorganic chromium(III) salts are absorbed very poorly; typically, the absorption is less than one percent (Linder, 1991). Citrate is a very effective chelator of trace elements, such as Cr(III), and may aid in absorption by removing trace elements from less accessible ligands and keeping them in a soluble form (Lönnerdal, 1989). The advantages of sodium selenate (i.e., selenium(VI)), over sodium selenite (i.e., selenium(IV)), in a nutrient premix recently have been described by Borschel, et al.

Although each mineral salt may be added to a nutritional product on an individual basis, such an approach generally is undesirable for large-scale commercial processes. Principal reasons for this include the need for multiple weighings of individual ingredients, the requirement for routinely measuring the concentration of each element in every batch of product, and the potential regular exposure of certain plant personnel to dusts from individual salts. With a premix, which typically is a previously-prepared mixture of mineral compounds and diluent materials, the correct addition of all minerals can be verified by measurements of the concentrations of one or more "marker" minerals added to the food via the premix. Thus, cost benefits and safety are realized through use of a premix of mineral compounds in the plant environment.

The inherent solubility of chromium chloride hexahydrate, which is commercially available as the dark green isomer trans-$[CrCl_2(H_2O)_4]Cl \cdot 2H_2O$, makes it a highly preferred compound for use in nutrient premixes that are added to liquid nutritional products. However, the solubility of this material has been observed to diminish measurably over time when chromium chloride hexahydrate is used as an ingredient in mixtures of nutrient minerals. Approaches to provide and sustain soluble chromium forms in premixes are described as principal components of this invention.

Accordingly, it is an object of the present invention to produce a stable nutritional powder, such as a premix used to prepare liquid or solid nutritional products, which is shelf stable and which may be incorporated into a liquid or solid nutritional product without precipitation of chromium. Such a product may become a part of a nutritionally complete or supplemental product that makes soluble chromium available to the user.

In view of the present disclosure or through practice of the present invention itself, other advantages, or the solution to attendant problems, may become apparent to one of ordinary skill in the art.

SUMMARY OF THE INVENTION

The present invention includes a nutritional powder and a method for making same.

In broadest terms, there is disclosed a nutritional powdered mixture comprising: (a) a carrier powder containing at least one non-chromium trace or ultratrace mineral; and (b) a carboxylic acid complexed chromium (III) powder substantially uniformly dispersed within said carrier powder, the complexed chromium (III) powder being sufficiently complexed to substantially resist formation of insoluble chromium-containing compounds; and wherein the nutritional powdered mixture comprises sufficient water content to substantially resist formation of insoluble chromium-containing compounds.

It is preferred that complexed chromium (III) powder is sufficiently complexed to substantially prevent oxidation of said chromium (III) to prevent the chromium from assuming an insoluble form such as chromium oxide or chromium hydroxide. It is also preferred that the complexed chromium (III) powder be substantially partitioned by a diluent powder.

To provide that the complexed chromium (III) powder comprises sufficient salt-bound water to substantially resist formation of insoluble chromium-containing compounds (such as by resisting formation of chromium oxide), the complexed chromium (III) powder is admixed with a sufficient amount of hydrated salts so as to produce a microenvironment of crystal-bound water around the complexed chromium (III) powder. For instance, the finished powder premixes described herein typically have total salt-bound water concentrations in the range of 5% to 15%. However, those premixes made with fully hydrated salts (e.g., zinc sulfate and/or ferrous sulfate) may be as high as 33% water.

The complexed chromium (III) powder may be produced from any chromium salt suitable for human consumption, such as, for instance, chromium (III) chloride hexahydrate, which is preferred. Importantly, anhydrous chromium chloride, a violet compound, is quite insoluble in water, and thus, must be avoided as an ingredient of premixes. In this instance, a crystal of chromium chloride exists in a stable "layer structure" in which each Cr(III) ion is located at the center of an octahedron of six chloride ions and each chloride links together two $CrCl_6^{-3}$ octahedra.

The chromium (III) may be complexed with any suitable compound suitable for human consumption. These compounds may include carboxylic acids. The carboxylic acids used in the present invention may be any carboxylic acid suitable for human consumption, preferably those that best chelate chromium (III). Such acids include those selected from the group consisting of ascorbic, citric, malonic, adipic and tartaric acids, and any mixtures thereof.

The non-chromium minerals may include one or more minerals of nutritive value in a form suitable for human consumption. Such minerals may include trace/ultratrace minerals such as those selected from the group consisting of iron, copper, zinc, selenium, molybdenum and manganese. These may be in the form of mineral-containing compounds, such as sodium molybdate dihydrate, sodium selenate pentahydrate, cupric sulfate, ferrous sulfate, manganese sulfate, sodium molybdate, sodium selenate, and zinc sulfate. The inherent stability of the selenate anion makes sodium selenate the preferred form for delivery of selenium (over sodium selenite). An example of selenium incorporated into a liquid nutritional product is disclosed in U.S. Pat. No. 5,221,545, hereby incorporated herein by reference. Each of these compounds can exist with different numbers of waters of hydration, including the anhydrous form.

The carrier material used in accordance with the compositions and methods of the present invention generally comprise mineral salts suitable for human consumption. Such materials may include zinc sulfate, anhydrous sodium selenate, hydrated ferrous sulfate, hydrated cupric sulfate, and hydrated manganous sulfate. These carrier materials may also include a diluent powder.

The diluent powder may be made of any organic and/or mineral material suitable for human consumption. The purpose of the diluent powder typically is for the purpose of formulating the final powder pre-mix into a finished solid or liquid product. Many suitable materials used for this purpose are known in the art. The diluent powder may be any material suitable for human consumption, including diluents typically used in the art of nutritional powder formulation, such as complex polysaccharides, carbohydrates, smaller sugars, dicalcium phosphate, tricalcium phosphate, etc. The preferred diluent is maltodextrin, such as Lodex® 10.

Naturally, it is preferred that both compounds and diluents used for powdered premixes must have purities suitable for use in foods, and should be powders that can be milled and blended without adhering to or reacting with stainless steel surfaces or with other compounds.

The specific mineral salts incorporated into a premix (described above) and the methods of comminution and order of combination of these salts prior to blending with each other, where specified, are important to the creation of a chemically stable mineral premix. The multiple-component premixes discussed herein invariably contain compounds (salts) that can react with each other to create new products, some of which may be insoluble. Although not intending to be limited by any theory of the invention, it is believed that direct reactions that produce insoluble compounds are avoided by selection of appropriate combinations of cations and anions, but that some indirect (unavoidable) reactions have equally important consequences. For example, the salt of a strong base and a weak acid, such as sodium molybdate or sodium selenate, will form a basic aqueous solution (pH>7) that subsequently may cause the formation of insoluble hydrated chromic oxide (Table 1). Some of the methods described herein successfully inhibit indirect reactions that adversely affect the solubility of chromium in mineral premixes. In other instances, physical barriers are used to block the level of contact required to initiate chemical interactions.

The nutritional powdered mixture of the present invention preferably comprises: (a) a plurality of non-chromium minerals selected from the group consisting of trace and ultratrace minerals in powder form; (b) a carboxylic acid complex of chromium (III) powder substantially uniformly dispersed within the non-chromium trace mineral powder(s), wherein the complexed chromium (III) powder is substantially partitioned by a diluent powder. The trace minerals may be iron, copper, zinc and manganese, for example. The ultratrace minerals may include molybdenum and selenium.

The principal goal of the composition and methods of the present invention is to provide chromium (III) in a complex that is sufficiently resistant to oxidation and to avoid the adverse effects on chromium solubility, while preferably controlling the pH of the mixture through the use of an acidic complexing agent. This helps one to produce a product which is substantially free of insoluble chromium.

The nutritional powdered mixture may additionally comprise a mixture comprising citric acid, chromium chloride hexahydrate, and a compound selected from the group consisting of sodium molybdate dihydrate and sodium selenate pentahydrate. The chromium(III) may form a hydrated chlorocitrate complex. Such complexes preferably contain sufficient amounts of salt-bound water to reduce the formation of insoluble chromium salts.

The disclosed compositions are useful as a nutrient mixture, such as for nutrient premixes. The nutritional powdered mixture may be used as part of a liquid or solid nutritional mixture which may additionally comprise a nutritional material selected from the group consisting of protein sources, carbohydrate sources, lipid sources, vitamin sources, and mixtures thereof.

The products of the present invention may provide a sole or supplemental source of nutrition for an individual, such as by meeting the RDA requirements.

Methods of the prior art generally involved producing a nutritional powder comprising: (a) preparing a first powder product comprising zinc sulfate, chromium chloride hexahydrate, sodium selenate, sodium molysorbate and maltodextrin; (b) preparing a second powder product comprising ferrous sulfate, cupric sulfate, manganous sulfate and citric acid; and (c) mixing the first powder product with a second powder product to form a third powder product. See FIG. 1.

Typically, the final product is screened before discharge into containers.

The Solution-Based Method

In contrast, the method of the present invention includes a method of producing a nutritional powder comprising: (a) preparing a solution of at least one water-soluble chromium (III) salt and an amount of at least one carboxylic acid sufficient to complex the chromium (III) ion of the water-soluble chromium (III) salt(s); (b) dispersing the solution into a carrier material powder comprising at least one hydrated mineral salt; and (c) mixing the mixture resulting from step (c) with at least one diluent powder material. This method provides the resultant powder with water content through the addition of a solution to a carrier powder so as to form a flowable powder.

An example of such a method includes: (a) preparing the following aqueous solutions: (i) a solution of chromium (III) chloride and an amount of citric acid sufficient to complex the chromium (III); and (ii) an optional solution of sodium molybdate; (b) combining solutions (i) and (ii) so as to form a combined solution; and (c) adding the combined solution into a mixture comprising (i) anhydrous sodium selenate and (ii) zinc sulfate; (d) mixing the mixture resulting from step (c) with: (i) maltodextrin; (ii) hydrated ferrous sulfate; (iii)

hydrated cupric sulfate; (iv) hydrated manganous sulfate; and (v) anhydrous citric acid.

Preferably, the combined solution is added in step (c) by spraying or dropwise addition. Typically, a flowable powder suspension is formed in step (c). It is also preferred that the hydrated ferrous sulfate, hydrated cupric sulfate, hydrated manganous sulfate, and anhydrous citric acid are admixed before being combined with the maltodextrin.

The method of the present invention also involves a method of producing a hydrated mineral salt nutritional powder. This method may be done by: (a) preparing the following aqueous solutions: (i) a solution of at least one water-soluble chromium (III) salt and an amount of at least one carboxylic acid sufficient to complex the chromium (III) ion of said at least one water-soluble chromium (III) salt; and (ii) a solution of at least one alkali metal molybdate; (b) combining solutions (i) and (ii) so as to form a combined solution; and (c) dispersing said combined solution into a carrier material powder comprising at least one hydrated mineral salt; (d) mixing the mixture resulting from step (c) with at least one diluent powder material selected from the group consisting of mineral and organic diluent powder materials, and mixtures thereof.

The combined solution may be added to the carrier material powder in step (c) by any method designed to slowly add the combined solution so as to incorporate it uniformly, preferably forming a flowable powder. Such methods may include spraying or dropwise addition of the combined solution.

The mineral salt may be any material fit for human consumption. Examples include zinc sulfate dihydrate, cuprous sulfate pentahydrate, hydrated ferrous sulfate, hydrated manganous sulfate and anhydrous sodium selenate, and mixtures thereof. Of these, zinc sulfate dihydrate is preferred.

The carrier material may also include anhydrous citric acid.

Preferably, the first powder product is prepared by first admixing the chromium (III) chloride hexahydrate and the citric acid monohydrate, followed by the admixture of the maltodextrin forming the first powder product. Also preferred is to add an additional amount of maltodextrin to the second powder product prior to the admixture of the second powder product and the third powder product. It is also preferred that the second powder product is maintained for sufficient time (typically on the order of at least one hour) to allow crystal surface neutralization-complexation reactions to occur prior to the addition of the additional amount of maltodextrin.

The Hydrated Salt Method

Another aspect of the invention is to provide a sufficiently hydrated environment for the chromium salt complex such that the chromium resists forming an insoluble form. This method provides water content to the powder through the use of highly hydrated mineral salts.

The method includes, fundamentally: (a) preparing a first powder product comprising (i) at least one soluble chromium (III) salt, (ii) at least one carboxylic acid and (iii) at least one diluent material powder; (b) preparing a second powder product comprising (i) at least one hydrated mineral salt so as to provide said chromium (III) salt with an environment of sufficiently hydrated salts so as to substantially resist formation of insoluble chromium-containing compounds (such as by resisting formation of chromium oxide), and (ii) at least one diluent material powder; (c) admixing the first and second powder products so as to form a third powder product; and (d) admixing the third powder product with at least one carrier material powder. The chromium, carboxylic acid, diluent materials and mineral salts may be as given above.

It is preferred that the first powder product is formed by first admixing the at least one soluble chromium (III) salt and the at least one carboxylic acid, followed by the admixture of the at least one diluent material powder.

Also, it is preferred that, where the at least one hydrated mineral salt of the second powder product comprises at least one basic hydrated mineral salt and at least one non-basic hydrated mineral salt, the second powder product is admixed with said first powder product in two stages, the first stage being the admixture of the hydrated mineral salt(s) to the first powder product and the second stage being the admixture of the non-basic hydrated mineral salt(s) to the first powder product. This allows the basic mineral salts to come first into contact with the carboxylic acid(s). Accordingly, there is also disclosed processes by which multiple mineral salts, some acidic and some basic, can be treated and combined within a carbohydrate matrix to provide soluble mineral premix powders that are stable for months. Both chemical and physical barriers may be involved. Because the resulting premix is totally soluble in an aqueous medium, a homogeneous distribution of minerals can be achieved throughout the water-based nutritional product, which may be ultimately be rendered in a liquid or solid form.

In another embodiment of the method, the first powder product is produced by spray drying an aqueous solution comprising (i) the soluble chromium (III) salt(s), (ii) the carboxylic acid(s) and (iii) the diluent material powder(s).

In yet another embodiment, the first powder product is encapsulated with at least one diluent material powder subsequent to spray drying.

With respect to all methods disclosed herein, all steps, procedures or processes may be considered to done without regard to the priority unless specified, or dictated by necessity or force of logic. The identification of steps or products in any priority is done only for the purposes of introducing them and distinguishing them from one another, unless otherwise dictated by necessity or force of logic.

Thus, processing methods are disclosed for preparation of nutrient trace mineral-ultratrace mineral premixes that provide complexed, soluble (bioavailable) chromium and that exhibit stability for intervals beyond six months. Some of the methods of the present invention incorporate controlled levels of water, attained by direct addition and by utilization of highly hydrated salts, to effect neutralization-complexation reactions that keep chromium in a soluble form. Other methods of the present invention involve primarily the physical isolation of chromium chloride through procedures that use spray drying and micro-encapsulation. Importantly, chromium, which is reacted to form a citrate complex for three of the processing methods, is both soluble and bioavailable.

The present invention also includes nutritional powder products made by the inventive processes described above.

BRIEF DESCRIPTION OF THE DRAWINGS

FIG. 1 shows a flow chart describing a preparation method in accordance with the prior art.

FIG. 4 shows a flow chart describing a preparation method in accordance with another embodiment of the present invention.

FIG. 5 shows a flow chart describing a preparation method in accordance with another embodiment of the present invention.

DETAILED DESCRIPTION OF THE PREFERRED EMBODIMENTS

In accordance with the foregoing summary, the following describes in more detail preferred embodiments of the method of the present invention through which one may arrive at the product of the present invention. These embodiments are representative of the method of the present invention, and should also be understood as exemplifying the use of the general classes of ingredients, such as complexing agents, carrier materials, diluent materials, and trace and ultratrace materials. The following embodiments are considered to be the best mode respectively of each variation of the method of the present invention.

Figure 2:
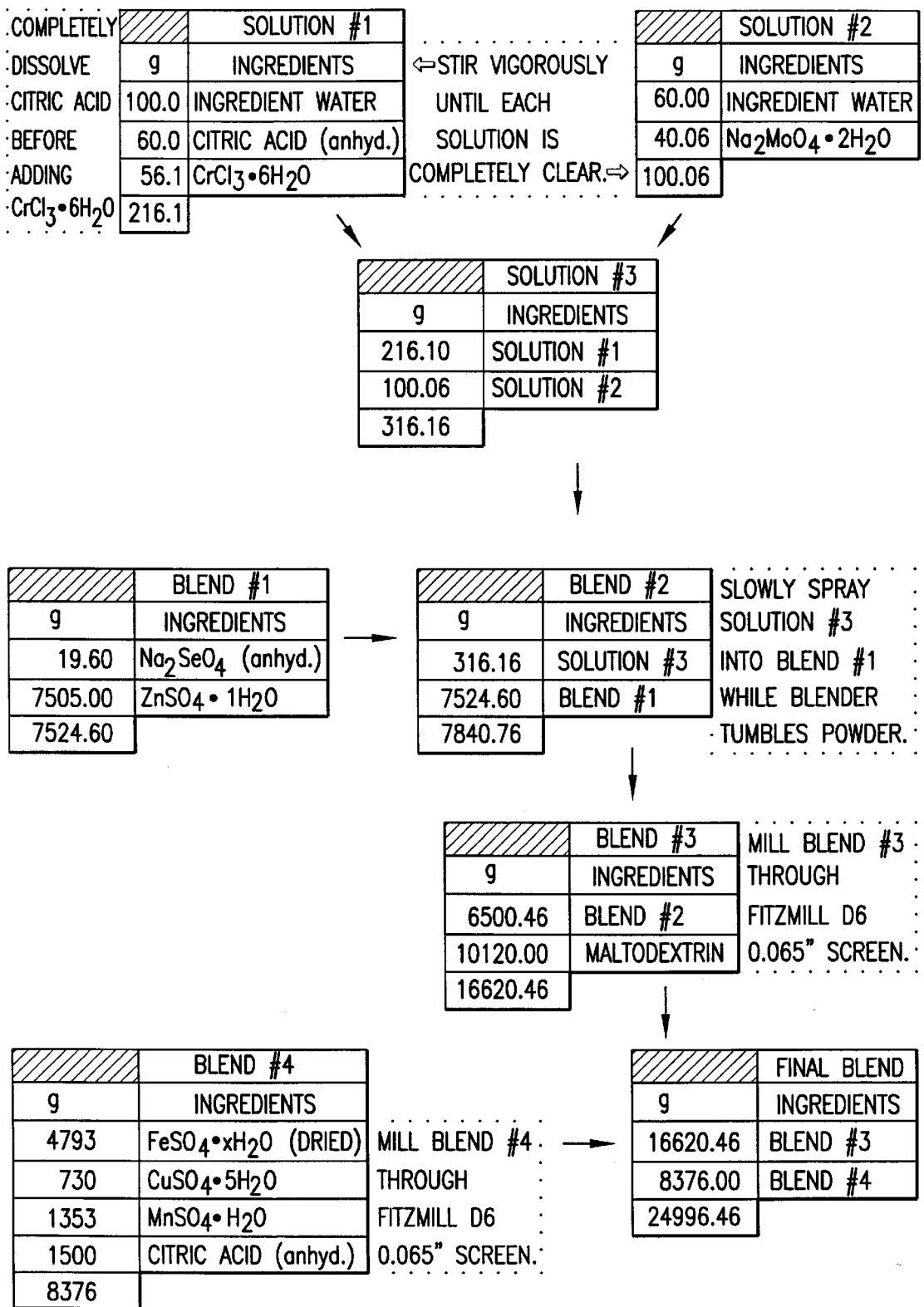
FIG. 2 shows a flow chart describing a preparation method in accordance with one embodiment of the present invention.

One method of the present invention involves the addition of water directly to reactive salts, as exemplified by the method described in FIG. 2. Another method of the present invention involves incorporating fully hydrated salts, as exemplified by the method described in FIG. 3. Still another method of the present invention utilizes spray-dried, carboxylic-acid-complexed chromium (i.e., chromium citrate), as exemplified by the method described in FIG. 4; and another blends microencapsulated carboxylic-acid-complexed chromium into the nutrient premix, as exemplified by the method described in FIG. 5.

The commercially available trans-$[CrCl_2(H_2O)_4]Cl.2H_2O$ readily dissolves in water to form an acidic solution. The violet hexaquo ion, $[Cr(H_2O)_6]^{3+}$, and green aquo-chloro ion, $[CrCl(H_2O)_5]^{3+}$, are acidic octahedral complexes that occur in

TABLE 1 pH of 0.1 Molar Aqueous Solutions (21° C.).

| Compound | pH |
|---|---|
| Citric Acid | 2.1 |
| Chromium Chloride | 2.7 |
| Ferrous Sulfate | 2.7 |
| Copper Sulfate | 4.0 |
| Manganese Sulfate | 4.0 |
| Zinc Sulfate | 4.5 |
| Maltodextrin/Lodex ® 10 | 4.7 |
| Sodium Molybdate | 7.6 |
| Sodium Selenate | 10.3 | aqueous solution and in numerous salts. The former ion, when exposed to basic conditions, forms an hydroxo ion that condenses to give a dimeric hydroxo bridged species:

$[(H_2O)_5Cr\{OH\}_2Cr(H_2O)_5]^{4+}$.

Soluble polymeric species of high molecular weight and eventually the formation of dark green gels are produced by further increase in pH (Cotton & Wilkinson; Gould). Thus, the complexity of chromium species in aqueous solutions is dependent on the concentration of hydronium ions (or pH, which is the negative logarithm of the molar concentration of hydronium ions).

Although anhydrous chromium chloride is known to be insoluble, the unfamiliar degree of solubility of other lesser-hydrated forms of chromium chloride required further investigation. The loss of waters of hydration from the hexahydrate of chromium chloride, either to a diluent material that behaves as a desiccant or to elevated temperatures that might occur in certain processing steps, such as milling, was evaluated as a mechanism that might contribute to the formation of insoluble chromium chloride in premixes.

Molybdenum may be added to premix as the soluble white salt sodium molybdate dihydrate, $Na_2MoO_4.2H_2O$. In general, only molybdate salts of alkali metals, ammonium and magnesium are readily soluble in water. Molybdenum oxo-anions form complexes with sulfate and with hydroxo compounds, such as glycerol, tartrate ion, and sugars. Importantly, binding sites involved in tartrate complexation are similar to those provided by citrate ions.

Weak acidification of a molybdate solution produces polymeric anions, whereas more strongly acid solutions give rise to molybdic acid. Yellow $MoO_3.H_2O$ slowly crystallizes from solutions at room temperature. For hot solutions, monohydrates, $[MoO_{4/2}O(H_2O)].H_2O$, are obtained rapidly (Cotton & Wilkinson).

Heteropoly acids are formed in molybdate solutions that contain other oxo-anions, such as phosphate $\{[P_2Mo_{18}O_{62}]^{6-}\}$, selenite, etc. The free acids and most salts of the heteropoly anions are extremely soluble in water. Unlike isopoly acids, heteropoly acids are stable without depolymerization in quite strongly acid solutions and often are themselves strong acids. Heteropolymolybdates of small cations, including those of some heavy metals, are water soluble. For larger cations, such as $Cs^+$ and others, salts are usually insoluble; $NH_4^+$, $K^+$ and $Rb^+$ salts sometimes are insoluble (Cotton & Wilkinson).

Sodium selenate is another indirect reactant that can affect the solubility of chromium (III). A 0.1-molar solution of this compound in water has a pH of ~10, which is sufficiently high to cause the formation of hydrated chromium(III) oxide, a compound known for its insolubility in both water and strong acids.

Maltodextrins typically are weak desiccants; measurements in our laboratory indicate that maltodextrin (Lodex 10®) does not remove waters of hydration from chromium chloride hexahydrate. However, because milling processes might subject the chromium chloride hexahydrate to elevated temperatures, milling was examined as a potential cause for the partial dehydration of the salt.

The relationship between loss of water and temperature rise was determined for chromium chloride hexahydrate by thermogravimetric analysis (TGA) and by desiccation experiments. Loss of water simply was related to mass changes during the heating processes. Up to three waters of hydration were removed from samples of chromium chloride hexahydrate by exposure of the fully hydrated compound to a combination of dry nitrogen and simple desiccants. No effect on solubility was observed. A final experiment that entailed removal of five waters of hydration (34% weight loss) was conducted by subjecting samples of chromium chloride hexahydrate in a nitrogen atmosphere to a temperature of 170° C. within the chamber of a thermogravimetric analysis (TGA) instrument. This alteration did not adversely affect solubility, and consequently, partial dehydration of chromium chloride hexahydrate was eliminated as a process responsible for production of insoluble chromium species.

An initial milling step (FIG. 3) was examined to determine the extent of possible localized temperature elevation during the process. The temperature of the outer casing of the micropulverizer, which is used for Blend #1 (FIG. 3), was observed to increase only slightly (≦3° C.) toward the end of milling through a screen that had circular apertures of 0.062-inch diameter. At the end of the milling process, the temperature of Blend #1 was ~27° C. Based on previous observations by thermogravimetric analysis instrumentation, no significant loss of water from chromium chloride hexahydrate is expected to occur at this temperature.

Valuable information was provided by a simple solubility test on freshly prepared premix. Trace mineral-ultratrace mineral premixes begin to form insoluble chromium particles within two weeks after preparation by conventional procedures. The term "insoluble" is used within the conventional chemical context and thus, does not imply an absolute lack of solubility. The test simply relies on visual observations of undissolved particles collected on filter paper as a rapid means for evaluation of the solubility of a sample from a given batch of premix. More rigorous testing is accomplished via concentration measurements for chromium in the filtrate by inductively coupled plasma spectrometry or related analytical techniques.

A method for testing the solubility of the powder mixture is as follows:

1. Place 100±1 mL of high-purity water into a 250-mL beaker that contains a PTFE-covered stirring bar. Place the beaker onto the surface of a hot plate to elevate the temperature of the water into the range 66 to 71° C.
2. If the hot plate (Step 1) does not have a built-in magnetic stirrer, move the beaker to a stirrer table and agitate the heated water at a moderate-to-low speed. Stir the heated water during all of Step 3.
3. Add 1.0 g of the premix to the heated water described in Step 1.
4. Continue stirring for 10 minutes; a clear yellow-green solution should result.
5. Filter the solution from Step 4 through Whatman no. 41 filter paper.
6. Observe the approximate number of particles that remain on the filter surface.

Observations from this test provide a basis for a qualitative judgment of the level of "insolubles" contained in a batch of premix (or in a blend). Quantitative measurements of soluble chromium are made by inductively coupled plasma spectrometry on 40 mL of filtrate that has been acidified with 0.8 mL concentrated hydrochloric acid. The "event" responsible for the formation of insoluble chromium appears to occur after manufacture of the premix and before 2 months of aging. After the initial 2 months, the particle density remained qualitatively constant up to 6 additional months. None of the samples examined had left storage (stored in the same location as that for manufacture of premix), thus, effects of transport and shipping of premix were not reflected in any of the above measurements.

In addition to the inorganic compounds previously cited, a water-soluble food-quality diluent material, such as a sugar or polysaccharide, is a major component of the premix. This diluent material, which might be dicalcium phosphate, tricalcium phosphate, dextrose, sucrose, maltodextrin, or another polysaccharide, acts as a carrier for the mineral salts and further is a diluent that facilitates physical separation of the mineral crystals (powder particles) within the premix. These materials are generally referred to as carrier materials. Reactions between metal ions and saccharides that give rise to off-flavors or atypical coloration, such as browning, generally are undesirable. Thus, selection of an appropriate diluent is quite relevant to attainment of a successful premix. Lodex® 10 is the preferred diluent.

Chemical Instability

Processes commonly used to produce homogeneous mixtures of powders, such as milling and blending, force the surfaces of individual crystalline particles into close physical contact. Typically, the maximal dimensions of particles in finished premixes range from <50 to 210 micrometers. In the presence of adsorbed water and loosely bound waters of hydration, surface reactions occur. For example, a basic salt, that is, the ionic compound formed by reaction of a strong base with a weak acid, can dissolve in surface water on a second crystal to increase the pH of the surface water to a level sufficient for precipitation of the hydrated oxide of the principal cation of the second crystal. The reaction of sodium molybdate or sodium selenate with chromium chloride hexahydrate to form insoluble hydrated chromium oxide exemplifies this situation. This specific reaction can be responsible for the conversion of soluble chromium chloride hexahydrate to an unwanted compound in premixes for nutritional foods. Importantly also, the atmosphere (air) into which the premix ingredients are immersed provides reactive gases (especially oxygen) that are in continuous contact with all particle surfaces.

Investigations in our laboratory have shown that chromium chloride hexahydrate powder combined with sodium molybdate dihydrate or sodium selenate pentahydrate, i.e., weighed portions ground together with mortar and pestle, provides a mixture that is insoluble in both water and in citric acid solution. Chemical interactions between chromium chloride and other powdered premix ingredients, including copper sulfate, ferrous sulfate, manganese sulfate and zinc sulfate have not produced insoluble reaction products. Thus, only compounds involved in processes that produce unwanted chemical products must be protected by chemical and physical means.

Organic acids common to foods, such as ascorbic, citric, malonic, adipic and tartaric acids, both affect the level of acidity and form complexes with numerous cations to influence the reactivity of the cations. Citric acid is particularly good at both functions, and other such acids may be used with or instead of citric acid. Citric acid ($C_6H_8O_4$) consists of three carboxylic acid groups covalently bound to a hydroxypropane unit. These carboxylic acid groups can dissociate in aqueous solutions to provide hydronium ions and simultaneously act as reaction cites for binding chromium (III) ions. Portions of citric acid powder may be combined individually with chromium chloride hexahydrate and with sodium molybdate dihydrate prior to any contact of these nutrient salts with each other or with other nutrient salts blended to form a premix.

Nature of Insoluble Particles

Each particle of premix represents a separate micro environment that consists of the major ionic compound, bound waters of hydration, adsorbed water and gaseous species of the atmosphere in which the particle is immersed.

Evidence of a particulate form of chromium in food products made in pilot-scale batches first was noted by analytical chemists who observed unusual variability in absorbance signals during measurements of chromium by graphite furnace atomic absorption spectrometry. This method, which requires injection of 20-μL volumes of acid-diluted product into a graphite furnace, is quite sensitive to heterogeneity of product. A sequence of 20-μL injections typically displayed randomly distributed broad-band peaks interspersed with the expected narrow absorption profiles.

An experiment that entailed multiple injections (~30) of appropriately-diluted premix solution into a graphite furnace provided a direct linkage to the trace mineral-ultratrace mineral premix aged for more than two weeks. That is, chromium absorbance profiles nearly-identical to those observed for acid-diluted nutritional product were recorded for the premix. This evidence was further supported by the observation that insoluble particles were collected on filter paper from solutions of the premixes in warm water and in acidified aqueous solutions.

The quantities of chromium and molybdenum in size fractions for this investigation appear to be correlated, however, no other mineral-related patterns are evident. The significance of this correlation is not readily apparent in light of the manner in which components of the premix are milled and blended. Importantly, chromium does not populate the larger particle-size ranges.

A brief study was made to determine whether undissolved particles of chromium chloride hexahydrate were being injected into the graphite furnace, as part of the method. Six dark-green particles were removed with a stainless-steel pin from fresh premix spread on a glass plate positioned on the platform of a low-power optical microscope. Five of the particles were ~70 μm in diameter, whereas the sixth particle appeared to have an approximate diameter of 50 μm. Each particle was placed in a separate indentation on a porcelain "spot plate", and subsequently, 20 μL of high-purity water was placed over the individual particles. The top of the spot plate was covered with wax paper and then transported to the laboratory in which the graphite furnace—atomic absorption spectrometer (PE-5000) was located. One particle then could be injected into the graphite tube simply by pulling a water-covered particle into a 20-μL piston pipet and subsequently injecting the total quantity into the furnace. The absorbances produced by single 70-μm and 50-μm particles were too high to be measured. Thus, individual particles responsible for the unusual absorbance signals originated from particles much smaller than 50 μm in diameter.

Particles within a sample of premix and within residue isolated on filter surfaces were studied by optical microscopy and by scanning electron microscopy (SEM). Reactions of individual particles with atmospheric gases or chemical reactions between particles in contact with each other are expected to occur on surfaces. Thus, visible evidence of surface reactions was sought by light microscopy. SEM provided both the possibility for observation of individual particles at high magnification and for composition information based on the x-ray fluorescence spectrum emitted by the area irradiated by the electron beam.

For samples of freshly-made premix, the colors, sizes and particle associations seen through the optical microscope did not provide new information concerning possible chemical interactions. However, observations on particles undissolved by dilute hydrochloric acid (and collected on white filter paper) provided supportive information concerning potential physicochemical processes that might affect the solubility of chromium chloride. Most of these particles were very fine (invisible to the naked eye), brown, and irregular in shape. They frequently occurred in clusters and had a "fluffy" appearance; individual fragments often were less than 5 μm in diameter. Most of the brown particles were composed of carbon and oxygen, with traces of silicon, aluminum, chlorine and sulfur. One particle observed by SEM was predominantly silicon with some carbon and oxygen; this particle probably originated from the surfactant added to the sample. Undissolved gray crystalline material, similar to that seen in fresh premix, consisted of chromium (principal constituent), sulfur and oxygen, and a trace of chlorine. Thus, these gray particles may be chromium chloride with a surface coating of chromium sulfide or sulfate, or chromium oxide or hydroxide; only speculation is possible concerning the chemical speciation on the particle surface. Black particles, which constituted only a quite small fraction of the total, had a shiny, metallic appearance and occurred as brittle flakes. Most of the black particles contained carbon, as a principal ingredient, and oxygen, but a few of the black particles were composed of additional elements, such as phosphorus, chlorine, aluminum, sodium, potassium, sulfur and copper. One black particle mostly consisted of iron, with small amounts of chlorine, carbon and oxygen.

Citrate

The important role of citrate in the formation of stable, soluble complexes of most mineral ions in aqueous solution is known from our earliest experiences with mineral premixes. The presence of citric acid as a normal component of the trace mineral-ultratrace mineral premixes reflects this knowledge. However, mixtures of powdered mineral salts are not microscopically homogeneous, and undesired surface reactions between premix components can occur on surfaces devoid of citrate. The reaction between sodium molybdate and chromium chloride, previously cited, became a particular focal point for experimentation.

The effectiveness of citric acid subsequently was demonstrated by an experiment that places these three compounds into intimate contact. A mixture of sodium molybdate dihydrate and citric acid monohydrate powders first was reacted overnight; subsequently, chromium chloride hexahydrate was added to this mixture. The three-component mixture appeared to pick up some water over time, and the mixture continued to be completely soluble. Thus, intimate mixtures of these two salts with citric acid prior to their combination inhibited the previously-observed reaction that produced an insoluble compound of chromium. This observation provided a basis for processes that emphasize effective contact between these two compounds and citric acid.

Methods that protect the solubility of chromium (III) within multiple-mineral premixes and that provide chromium(III) in a bioavailable complexed form are summarized. Approaches described herein for preparation of mineral premix encompass a range of chemical and physical treatments that inhibit or reduce rates of reactions responsible for the formation of insoluble chromium-containing particles. Common to each approach is: a) the uniform dispersion of ultratrace mineral compounds within the powder mixture by milling and blending operations, and b) the physical partitioning of potentially reactive compounds by a diluent material, such as maltodextrin. Beyond these common features, combinations of acidulants, complexing agents, hydration levels and encapsulation barriers are used to stabilize chromium chloride. In each instance, citric acid serves as both an acid and a complexing agent.

Citric acid, when separately milled and blended with sodium molybdate dihydrate (or sodium selenate pentahydrate) and chromium chloride hexahydrate, can slow unwanted reactions between these two salts within powdered premixes. The process provides for intimate contact of citric acid with the chromium and molybdenum salts at the earliest possible stages of blending to create desirable chemical microenvironments. Citric acid provides localized acidity to inhibit the formation of hydroxides or hydrated oxides of chromium while simultaneously forming stable citrate complexes with chromium (III) and molybdate. This modification in processing discourages the formation of insoluble chromium-containing particles and supports increased shelf life for premixes. Further changes in processing that effect greater reactivity between chromium III and citrate have been found necessary. Methods for accomplishing the required neutralization-complexation reactions within the context of preparation of powdered mineral premixes are described. Observations concerning the chemical and physical stability of premixes were based on laboratory-scale preparations of 500-g quantities made by grinding and mixing components with an agate mortar and pestle and on 25-kg batches for each process made by dissolution, spraying, milling and blending within a commercial facility.

The Prior Art Method

A method for preparation of premix that entails the systematic combination of nutrient compounds and diluent by multiple steps that include milling and blending is illustrated in FIG. 1.

Generally, micropulverizers and stainless-steel V-blenders are used to accomplish the required operations. All compounds and maltodextrin are stored and transported in plastic containers. Here, granular chromium chloride hexahydrate is blended with zinc sulfate, sodium selenate, sodium molysorbate and maltodextrin and milled, blended and milled again (Blend A). Subsequently, ferrous sulfate, cupric sulfate, manganous sulfate and citric acid are blended and milled (Blend B). Blend A and Blend B ultimately are blended to form the final homogeneous premix. Although the method illustrates a logical combination of ingredients, long term stability is not attained.

Methods of the Present Invention

A separate approach to neutralization of the basic salt sodium molybdate (FIG. 2) involves the addition of sufficient citric acid to an aqueous solution of chromium chloride to complex the chromium(III) (Solution #1) and a separate neutralization of the sodium molybdate (Solution #2) before combining these solutions to form Solution #3. The resulting solution (Solution #3) then is sprayed slowly into Blend #1, which consists of anhydrous sodium selenate previously blended with a relatively large quantity of zinc sulfate. Solution #3 must be sprayed or added dropwise to enable zinc sulfate to accommodate the water and yet remain in an unclumped powder form. Thus, Blend #2 is a flowing powder that readily can be blended with maltodextrin (Blend #3) and finally with a blend (Blend #4) of hydrated ferrous sulfate, hydrated cupric sulfate, hydrated manganous sulfate and anhydrous citric acid. This premix is stable for more than six months. The low cost, simplicity, and effectiveness of this approach make it a preferred processing method.

Figure 3:
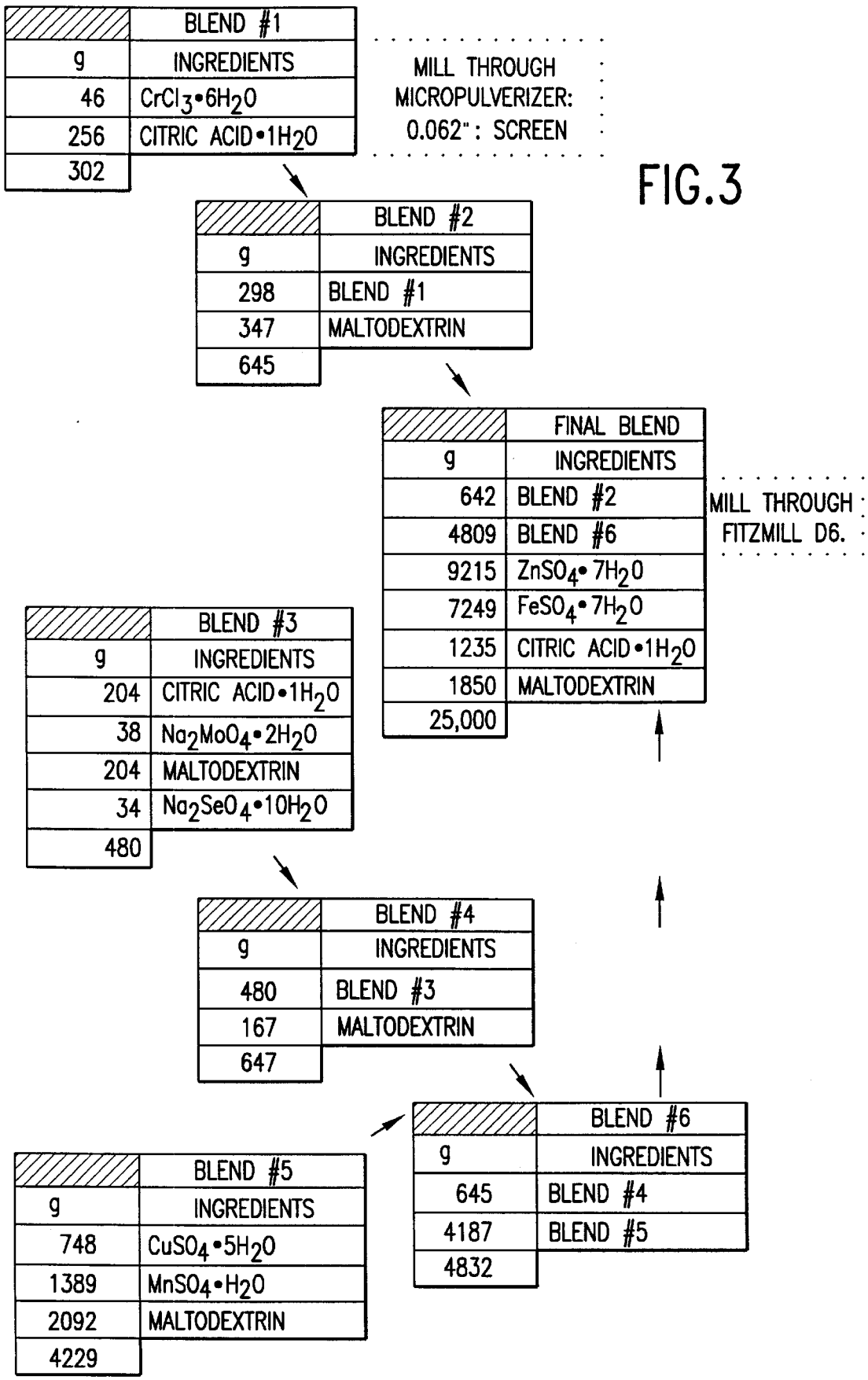
FIG. 3 shows a flow chart describing a preparation method in accordance with another embodiment of the present invention.

Another variation of the method of the present invention for preparation of trace mineral-ultratrace mineral premix is embodied in the process described in FIG. 3. For this method, hydrated citric acid is used in conjunction with highly-hydrated mineral salts to provide a reactive environment for neutralization of sodium molybdate and sodium selenate. That is, waters of hydration are loosely bound for multiply-hydrated salts and these waters, along with adsorbed water, are available for formation of microsolutions on crystal surfaces for acid-base and other reactions. Manufacture of this mineral premix commences with a pulverized mixture of citric acid monohydrate and chromium chloride hexahydrate (Blend #1) that is blended with maltodextrin (Blend #2). Then, a separate blend (Blend #3) is prepared by first combining sodium molybdate dihydrate with citric acid monohydrate. Subsequently, sodium selenate pentahydrate is added and maltodextrin is blended into this mixture. Following the final blending step, Blend #3 is held for at least one hour prior to further dilution with maltodextrin (Blend #4) to provide adequate time for neutralization-complexation reactions to occur on crystal surfaces. This blend forms a soft agglomerated powder that does not cake. Blend #5, which is a maltodextrin-diluted blend of cupric sulfate pentahydrate and manganous sulfate monohydrate then is combined with Blend #4 to form Blend #6. Finally, Blend Stages #2 and 6 are brought together with zinc sulfate heptahydrate, ferrous sulfate heptahydrate, citric acid monohydrate and more maltodextrin to produce a final blend of premix. This mineral premix tends to cake, but chromium solubility is good for more than six months.

Spray drying technology provides a unique opportunity to react chromium with citric acid in solution phase and yet introduce chromium into powdered premix as a dry powder component. Thus, chromium citrate is the form effectively added to this premix. For this method (FIG. 4), chromium chloride hexahydrate is dissolved in ingredient water that contains dissolved citric acid. Complexation of chromium (III) by citrate anions occurs in the solution phase. A weighed portion of maltodextrin then is dissolved in this solution to provide a final solution suitable for injection into a spray dryer, that is, the final solution contains the requisite level of total solids (8 to 10% maltodextrin). This solution is spray dried (NIRO Atomizer, Nichols Engineering and Research, Copenhagen) to form a fine green powder that typically contains 3 to 4% (w/w) chromium. For the example given in FIG. 4, the chromium concentration in the spray-dried material is 3.4%. The spray-dried powder then is diluted with maltodextrin before addition to the final blend. Separately, sodium molybdate dihydrate is blended with maltodextrin and with anhydrous sodium selenate to complete Blend #2. The resulting mixture then is combined with the Blend #3 mix of cupric sulfate pentahydrate, manganous sulfate monohydrate and maltodextrin to form Blend #4. In the concluding step, Blends #1 and #4 are combined with zinc sulfate, ferrous sulfate, anhydrous citric acid and maltodextrin to yield a final milled blend of the premix. This mineral premix provides all added minerals in soluble form for more than six months.

Microencapsulation of chromium chloride provides possibilities for chemical reactions in aqueous phase, such as complexation by citrate or other anions, followed by physical isolation of the spray-dried particles within a thin barrier (layer) of polysaccharide that is soluble in warm water. Following dissolution of chromium chloride hexahydrate and maltodextrin in water, the resulting solution is spray dried by the technique described in Method IV. The spray-dried powder then is encapsulated with maltodextrin in an agglomerator unit, such as the Glatt agglomerator (model GPCG3), by spraying a solution of maltodextrin into a column of particles (powder from the spray dry process) supported in a warm air stream. The green microencapsulated powder then is incorporated into premix by the process illustrated in FIG. 5. Typically, the microencapsulated chromium chloride contains 3 to 3.5% chromium. For the scheme in FIG. 5, the chromium concentration is 3.05%. Grinding and milling processes are avoided in preparation of the premix to maintain the integrity of the barrier on the surface of the microencapsulated particles.

A weighed quantity of microencapsulated particles is blended with maltodextrin to form Blend #1. In a separate step, sodium molybdate dihydrate is blended with maltodextrin (Blend #2), and this mixture subsequently is blended with anhydrous sodium selenate and more maltodextrin to create Blend #3. Independently, cupric sulfate pentahydrate and manganous sulfate monohydrate are blended with a quantity of maltodextrin to form Blend #4. Blends #3 and #4 then are mixed (Blend #5) and introduced, along with Blend #1, into a mixture of hydrated zinc sulfate and ferrous sulfate, anhydrous citric acid and maltodextrin to provide the mixture finally blended for this premix. This trace mineral-ultratrace mineral premix provides all added minerals in soluble form for more than six months.

The methods exemplified in FIGS. 2 through 5 are unique preparations of trace mineral-ultratrace mineral premix that accomplish high levels of chemical and physical stability important to bio-utilization of minerals provided in correct oxidation states and in ratios and concentrations needed for fortification of medical nutritional products and other possible foodstuffs. Sustained solubility of mineral components in multiple-mineral premix assures the homogeneous distribution of the relevant minerals within water-based nutritional products and lengthens the shelf life of these products, thus enhancing quality and lowering costs.

What is claimed is:

1. A nutritional powdered mixture, said mixture comprising:
   a. a carrier powder containing at least one non-chromium trace or ultratrace mineral;
   b. a carboxylic acid complexed chromium, (III) powder substantially uniformly dispersed within said carrier powder wherein said carboxylic acid is selected from the group consisting of citric, malonic, malic, adipic and tartaric acids, and mixtures thereof, said complexed chromium (III) ion being sufficiently complexed to substantially resist formation of insoluble chromium-containing compounds; and wherein said nutritional powdered mixture comprises sufficient water content to substantially resist formation of insoluble chromium-containing compounds.

2. A nutritional powdered mixture according to claim 1, wherein said complexed chromium (III) powder comprises chromium (III) chloride hexahydrate.

3. A nutritional powdered mixture according to claim 1, said complexed chromium (III) powder being substantially partitioned by at least one diluent powder.

4. A nutritional powdered mixture according to claim 3, wherein said at least one diluent material comprises maltodextrin.

5. A nutritional powdered mixture according to claim 1, said mixture comprising citric acid, chromium chloride hexahydrate, and a compound selected from the group consisting of sodium molybdate dihydrate and sodium selenate pentahydrate.

6. A nutritional powdered mixture according to claim 1, wherein said trace minerals are selected from the group consisting of iron, copper, zinc and manganese.

7. A nutritional powdered mixture according to claim 1, wherein said ultratrace minerals are selected from the group consisting of molybdenum and selenium.

8. A nutritional product, said product incorporating a nutritional powdered mixture according to claim 1.

9. A nutritional powdered mixture, said mixture comprising:
   a. a powder comprising a nutritional material selected from the group consisting of protein sources, carbohydrate sources, lipid sources, vitamin sources, and mixtures thereof;
   b. a carrier powder containing at least one non-chromium trace or ultratrace mineral;
   c. a carboxylic acid complex chromium (III) powder substantially uniformly dispersed within said carrier powder; said carboxylic acid is selected from the group consisting of citric, malonic, malic, adipic and tartaric acids and mixtures thereof, said complexed chromium (III) ion being sufficiently complexed to substantially resist formation of insoluble chromium-containing compounds; and wherein said nutritional powdered mixture comprises sufficient water content to substantially resist formation of insoluble chromium-containing compounds.

10. A nutritional powdered mixture according to claim 9, wherein said complexed chromium (III) powder comprises chromium (III) citrate.

11. A nutritional powdered mixture according to claim 9, said complexed chromium (III) powder being substantially partitioned by at least one diluent powder.

12. A nutritional powdered mixture according to claim 11, wherein said at least one diluent material comprises maltodextrin.

13. A nutritional powdered mixture according to claim 9, said mixture comprising citric acid, chromium chloride hexahydrate, and a compound selected from the group consisting of sodium molybdate dihydrate and sodium selenate pentahydrate.

14. A nutritional powdered mixture according to claim 9, wherein said trace minerals are selected from the group consisting of iron, copper, zinc and manganese.

15. A nutritional powdered mixture according to claim 9, wherein said ultratrace minerals are selected from the group consisting of molybdenum and selenium.

16. A nutritional product, said product incorporating a nutritional powdered mixture according to claim 9.

17. A method of producing a nutritional powder, said method comprising:
   a. preparing a solution of at least one water-soluble chromium (III) salt and an amount of at least one carboxylic acid selected from the group constituting of citric, malonic, malic, adipic and tartaric acids and mixtures thereof, sufficient to complex the chromium (III) ion of said at least one water-soluble chromium (III) salt;
   b. dispersing said solution into a carrier material powder comprising at least one mineral salt and citric acid so as to form a hydrated powder; and
   c. mixing said hydrated powder resulting from step (b) with at least one diluent powder material.

18. A method of producing a nutritional powder according to claim 17 wherein said solution of step (a) additionally comprises at least one mineral salt.

19. A method of producing nutritional powder according to claim 18 wherein said at least one mineral salt comprises at least one basic mineral salt, said at least one basic mineral salt added subsequent to said complexation of said chromium (III) ion, so as to maintain the pH of said solution below about 7.

20. A method of producing a nutritional powder according to claim 17 wherein said carrier material powder comprises a mineral salt selected from the group consisting of zinc sulfate dihydrate, cuprous sulfate pentahydrate, hydrated ferrous sulfate, hydrated manganous sulfate and anhydrous sodium selenate, and mixtures thereof.

21. A method of producing a nutritional powder according to claim 17 wherein said at least one diluent powder material comprises maltodextrin.

22. A method of producing a nutritional powder according to claim 17 wherein said combined solution is added to said carrier material powder in step (c) by a method selected from the group consisting of spraying and dropwise addition of said combined solution.

23. A nutritional powder produced according to the method of claim 17.

24. A method of producing a hydrated mineral salt nutritional powder, said method comprising:
   a. preparing a first powder product comprising (i) at least one soluble chromium (III) salt, (ii) at least one carboxylic acid selected from the group consisting of citric, malonic, malic, adipic and tartaric acids and mixtures thereof and (iii) at least one diluent material powder;
   b. preparing a second powder product comprising (i) at least one hydrated mineral salt so as to provide said chromium (III) salt with an environment of sufficiently hydrated salts so as to substantially resist formation of insoluble chromium-containing compounds, and (ii) at least one diluent material powder;
   c. admixing said first and second powder products so as to form a third powder product; and
   d. admixing said third powder product with at least one carrier material powder.

25. A method of producing a hydrated mineral salt nutritional powder according to claim 24 wherein said at least one soluble chromium (III) salt comprises chromium (III) chloride hexahydrate.

26. A method of producing a hydrated mineral salt nutritional powder according to claim 24 wherein said first powder product is formed by first admixing said at least one soluble chromium (III) salt and said at least one carboxylic acid, followed by the admixture of said at least one diluent material powder.

27. A method of producing a hydrated mineral salt nutritional powder according to claim 24 wherein said first powder product is produced by spray drying an aqueous solution comprising (i) said at least one soluble chromium (III) salt, (ii) said at least one carboxylic acid and (iii) said at least one diluent material powder.

28. A method of producing a hydrated mineral salt nutritional powder according to claim 27 wherein said first powder product is encapsulated with at least one diluent powder material subsequent to said spray drying.

29. A method of producing a hydrated mineral salt nutritional powder according to claim 24, wherein said at least one hydrated mineral salt of said second powder product comprises at least one basic hydrated mineral salt and at least one non-basic hydrated mineral salt, and wherein said second powder product is admixed with said first powder product in two stages, the first stage being the admixture of said at least one basic hydrated mineral salt to said first powder product and the second stage being the admixture of said at least one non-basic hydrated mineral salt to said first powder product.

30. A method of producing a hydrated mineral salt nutritional powder according to claim 24 wherein said at least one hydrated mineral salt of said second powder product comprises at least one basic hydrated mineral salt and at least one non-basic hydrated mineral salt, and wherein an amount of diluent powder material is added to said at least one basic hydrated mineral salt prior to said admixture of said at least one non-basic hydrated mineral salt.

31. A method of producing a hydrated mineral salt nutritional powder according to claim 24 wherein said second powder product is maintained admixed with said first powder product for sufficient time to allow crystal surface neutralization-complexation reactions to occur.

32. A hydrated mineral salt nutritional powder produced according to the method of claim 24.

33. A method of producing a hydrated mineral salt nutritional powder, said method comprising:
   (a) spray drying an aqueous solution comprising (i) chromium (III) chloride hexahydrate, (ii) citric acid monohydrate and (iii) maltodextrin, so as to form a first powder product;
   (b) preparing a second powder product comprising (i) sodium molybdate dihydrate, (ii) anhydrous sodium selenate and (iii) maltodextrin;
   (c) preparing a third powder product comprising (i) cupric sulfate pentahydrate, (ii) manganous sulfate monohydrate, and (iii) maltodextrin;
   (d) admixing said second powder product and said third powder product so as to form a fourth powder product; and
   (e) admixing said first powder product, said fourth powder product, (i) at least one hydrated zinc sulfate selected from the group consisting of zinc sulfate heptahydrate and zinc sulfate dihydrate, (ii) ferrous sulfate heptahydrate, (iii) citric acid monohydrate and (iv) maltodextrin.

34. A method of producing a hydrated mineral salt nutritional powder according to claim 33 wherein an additional amount of maltodextrin is added to said first powder product prior to said admixture of said first powder product in step (e).

35. A hydrated mineral salt nutritional powder produced according to the method of claim 33.

36. A method of producing a nutritional powder, said method comprising:
   (a) spray drying an aqueous solution comprising (i) chromium (III) chloride hexahydrate, (ii) citric acid monohydrate and (iii) maltodextrin, so as to form a first powder product;
   (b) encapsulating said first powder product with maltodextrin so as to form an encapsulated first powder product;
   (c) preparing a second powder product comprising (i) sodium molybdate dihydrate, (ii) anhydrous sodium selenate and (iii) maltodextrin;
   (d) preparing a third powder product comprising (i) cupric sulfate pentahydrate, (ii) manganous sulfate monohydrate, and (iii) maltodextrin;
   (e) admixing said second powder product and said third powder product so as to form a fourth powder product; and
   (f) admixing said encapsulated first powder product, said fourth powder product, (i) at least one hydrated zinc sulfate selected from the group consisting of zinc sulfate heptahydrate and zinc sulfate dihydrate, (ii) ferrous sulfate heptahydrate, (iii) citric acid monohydrate and (iv) maltodextrin.

37. A method of producing a hydrated mineral salt nutritional powder according to claim 36 wherein an additional amount of maltodextrin is added to said encapsulated first powder product prior to said admixture of said encapsulated first powder product in step (f).

38. A method of producing a hydrated mineral salt nutritional powder according to claim 36 wherein said second powder product is prepared by preparing first admixing maltodextrin separately with (i) said sodium molybdate dihydrate and (ii) said anhydrous sodium selenate, before preparing said second powder product therefrom.

39. A hydrated mineral salt nutritional powder produced according to the method of claim 36.

* * * * *

UNITED STATES PATENT AND TRADEMARK OFFICE
CERTIFICATE OF CORRECTION

PATENT NO. : 5,908,647

DATED : June 1, 1999

INVENTOR(S) : Danold Wayne Golightly, et al.

It is certified that error appears in the above-identified patent and that said Letters Patent is hereby corrected as shown below:

Column 15, line 36, after "consisting of" insert --ascorbic--.

Column 16, line 10, after "consisting of" insert --ascorbic--.

Column 16, line 45, "constituting" should read --consisting--.

Column 16, line 46, before "citric" insert --ascorbic--.

Column 17, line 18, before "citric" insert --ascorbic--.

Signed and Sealed this

Tenth Day of October, 2000

*Attest:*

*Attesting Officer*

Q. TODD DICKINSON

*Director of Patents and Trademarks*